(12) United States Patent
Vasiliotis et al.

(10) Patent No.: US 8,626,409 B2
(45) Date of Patent: Jan. 7, 2014

(54) AUTOMATIC TRANSMISSIONS AND METHODS THEREFOR

(71) Applicant: Fallbrook Intellectual Property Company LLC, San Diego, CA (US)

(72) Inventors: Christopher M. Vasiliotis, Cedar Park, TX (US); Loren T. McDaniel, Denver, CO (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 13/681,792

(22) Filed: Nov. 20, 2012

(65) Prior Publication Data

US 2013/0080006 A1 Mar. 28, 2013

Related U.S. Application Data

(63) Continuation of application No. 12/335,810, filed on Dec. 16, 2008, now Pat. No. 8,321,097.

(60) Provisional application No. 61/016,305, filed on Dec. 21, 2007.

(51) Int. Cl.
*G06F 17/00* (2006.01)
(52) U.S. Cl.
USPC .......................................................... 701/51
(58) Field of Classification Search
None
See application file for complete search history.

(56) References Cited

U.S. PATENT DOCUMENTS 719,595 A 2/1903 Huss
(Continued)

FOREIGN PATENT DOCUMENTS

CH 118064 12/1926
CN 1157379 A 8/1997
(Continued)

OTHER PUBLICATIONS

Goi et al., DeVelopment of Traction Drive IDG (T-IDG), Proceedings of International Congress on Continuously Variable and Hybrid Transmissions, Sep. 2009, pp. 6 pages.
(Continued)

*Primary Examiner* — Thomas Tarcza
*Assistant Examiner* — Adam Alharbi
(74) *Attorney, Agent, or Firm* — Knobbe Martens Olson & Bear LLP

(57) ABSTRACT

Systems and methods for controlling transmissions and associated vehicles, machines, equipment, etc., are disclosed. In one case, a transmission control system includes a control unit configured to use a sensed vehicle speed and a commanded, target constant input speed to maintain an input speed substantially constant. The system includes one or more maps that associate a speed ratio of a transmission with a vehicle speed. In one embodiment, one such map associates an encoder position with a vehicle speed. Regarding a specific application, an automatic bicycle transmission shifting system is contemplated. An exemplary automatic bicycle includes a control unit, a shift actuator, various sensors, and a user interface. The control unit is configured to cooperate with a logic module and an actuator controller to control the cadence of a rider. In one embodiment, a memory of, or in communication with, the control unit includes one or more constant cadence maps that associate transmission speed ratios with bicycle speeds.

18 Claims, 7 Drawing Sheets

(56) References Cited

U.S. PATENT DOCUMENTS

| | | | |
|---|---|---|---|
| 1,121,210 A | 12/1914 | Techel |
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,092 A | 5/1927 | Arter et el. |
| 1,629,902 A | 5/1927 | Arter et al. |
| 1,631,069 A | 5/1927 | Smith |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,209,254 A | 7/1940 | Ahnger |
| 2,230,398 A | 2/1941 | Benjafield |
| 2,259,933 A | 10/1941 | Holloway |
| 2,325,502 A | 7/1943 | Auguste |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,913,932 A | 11/1959 | Oehru |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madison |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,071,194 A | 1/1963 | Geske |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,374,009 A | 3/1968 | Jeunet |
| 3,407,687 A | 10/1968 | Hayashi |
| 3,440,895 A | 4/1969 | Fellows |
| 3,464,281 A | 9/1969 | Azuma et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,996,807 A | 12/1976 | Adams |
| 4,053,173 A | 10/1977 | Chase, Sr. |
| 4,086,026 A | 4/1978 | Tamanini |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,493,677 A | 1/1985 | Ikenoya |
| 4,494,524 A | 1/1985 | Wagner |
| 4,496,051 A | 1/1985 | Ortner |
| 4,526,255 A | 7/1985 | Hennessey et al. |
| 4,549,874 A | 10/1985 | Wen |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,628,766 A | 12/1986 | De Brie Perry |
| 4,630,839 A | 12/1986 | Seol |
| 4,647,060 A | 3/1987 | Tomkinson |
| 4,700,581 A | 10/1987 | Tibbals, Jr. |
| 4,713,976 A | 12/1987 | Wilkes |
| 4,717,368 A | 1/1988 | Yamaguchi et al. |
| 4,725,258 A | 2/1988 | Joanis, Jr. |
| 4,735,430 A | 4/1988 | Tomkinson |
| 4,744,261 A | 5/1988 | Jacobson |
| 4,756,211 A | 7/1988 | Fellows |
| 4,781,663 A | 11/1988 | Reswick |
| 4,806,066 A | 2/1989 | Rhodes et al. |
| 4,838,122 A | 6/1989 | Takamiya et al. |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,961,477 A | 10/1990 | Sweeney |
| 4,964,312 A | 10/1990 | Kraus |
| 4,976,170 A | 12/1990 | Hayashi et al. |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,156,412 A | 10/1992 | Meguerditchian |
| 5,194,052 A | 3/1993 | Kazuhiko et al. |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |

| | | | |
|---|---|---|---|
| 5,318,486 A | 6/1994 | Lutz |
| 5,323,570 A | 6/1994 | Kuhlman et al. |
| 5,330,396 A | 7/1994 | Lohr et al. |
| 5,355,749 A | 10/1994 | Obara et al. |
| 5,356,348 A | 10/1994 | Bellio et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,413,540 A | 5/1995 | Streib et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,758 A | 9/1997 | Williamson |
| 5,683,322 A | 11/1997 | Meyerle |
| 5,690,346 A | 11/1997 | Keskitalo |
| 5,746,676 A | 5/1998 | Kawase et al. |
| 5,755,303 A | 5/1998 | Yamamoto et al. |
| 5,799,541 A | 9/1998 | Arbeiter |
| 5,819,864 A | 10/1998 | Koike et al. |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,050,854 A | 4/2000 | Fang et al. |
| 6,053,833 A | 4/2000 | Masaki |
| 6,053,841 A | 4/2000 | Kolde et al. |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,155,132 A | 12/2000 | Yamane |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,201,315 B1 | 3/2001 | Larsson |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,293,575 B1 | 9/2001 | Burrows et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,340,067 B1 | 1/2002 | Fujiwara |
| 6,358,178 B1 | 3/2002 | Wittkopp |
| 6,375,412 B1 | 4/2002 | Dial |
| 6,390,946 B1 | 5/2002 | Hibi et al. |
| 6,406,399 B1 | 6/2002 | Xioalan |
| 6,419,608 B1 | 7/2002 | Miller |
| 6,425,838 B1 | 7/2002 | Matsubara et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,523,223 B2 | 2/2003 | Wang |
| 6,532,890 B2 | 3/2003 | Chen |
| 6,551,210 B2 | 4/2003 | Miller |
| 6,571,726 B2 | 6/2003 | Tsai et al. |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,723,016 B2 | 4/2004 | Sumi |
| 6,805,654 B2 | 10/2004 | Nishii |
| 6,849,020 B2 | 2/2005 | Sumi |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |

| | | |
|---|---|---|
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| D546,741 S | 7/2007 | Iteya et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| D548,655 S | 8/2007 | Barrow et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| D579,833 S | 11/2008 | Acenbrak |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller |
| 7,540,818 B2 | 6/2009 | Miller et al. |
| 7,547,263 B2 * | 6/2009 | Fukuda et al. ................ 474/70 |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,115 B2 | 6/2010 | Serkh |
| 7,731,615 B2 | 6/2010 | Miller et al. |
| 7,762,920 B2 | 7/2010 | Smithson et al. |
| 7,785,228 B2 | 8/2010 | Smithson et al. |
| 7,828,685 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,262,536 B2 | 9/2012 | Nichols et al. |
| 8,267,829 B2 | 9/2012 | Miller et al. |
| 8,317,650 B2 | 11/2012 | Nichols et al. |
| 8,317,651 B2 | 11/2012 | Lohr |
| 8,321,097 B2 * | 11/2012 | Vasiliotis et al. ................ 701/51 |
| 8,342,999 B2 | 1/2013 | Miller |
| 8,360,917 B2 | 1/2013 | Nichols et al. |
| 8,376,903 B2 | 2/2013 | Pohl et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0153695 A1 | 10/2002 | Wang |
| 2002/0189524 A1 | 12/2002 | Chen |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0176247 A1 | 9/2003 | Gottschalk |
| 2003/0216201 A1 * | 11/2003 | Takeda ........................... 474/70 |
| 2003/0216216 A1 | 11/2003 | Inoue et al. |
| 2003/0221892 A1 | 12/2003 | Matsumoto et al. |
| 2004/0051375 A1 | 3/2004 | Uno |
| 2004/0058772 A1 | 3/2004 | Inoue et al. |
| 2004/0082421 A1 | 4/2004 | Wafzig |
| 2004/0119345 A1 | 6/2004 | Takano |
| 2004/0204283 A1 | 10/2004 | Inoue |
| 2004/0237698 A1 | 12/2004 | Hilsky et al. |
| 2005/0037876 A1 | 2/2005 | Unno et al. |
| 2005/0172752 A1 | 8/2005 | Florczyk et al. |
| 2005/0215369 A1 * | 9/2005 | Fukuda et al. ................ 474/82 |
| 2005/0227809 A1 | 10/2005 | Bitzer et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0200300 A1 | 8/2008 | Smithson et al. |
| 2008/0305920 A1 | 12/2008 | Nishii et al. |
| 2009/0107454 A1 | 4/2009 | Hiyoshi et al. |
| 2009/0251013 A1 | 10/2009 | Vollmer et al. |
| 2010/0056322 A1 | 3/2010 | Thomassy |
| 2011/0088503 A1 | 4/2011 | Armstrong et al. |
| 2011/0127096 A1 | 6/2011 | Schneidewind |
| 2011/0172050 A1 | 7/2011 | Nichols et al. |
| 2011/0218072 A1 | 9/2011 | Lohr et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0238386 A1 | 9/2012 | Pohl et al. |
| 2012/0258839 A1 | 10/2012 | Smithson et al. |
| 2012/0309579 A1 | 12/2012 | Miller et al. |
| 2013/0035200 A1 | 2/2013 | Noji et al. |
| 2013/0053211 A1 | 2/2013 | Fukuda et al. |
| 2013/0072340 A1 | 3/2013 | Bazyn et al. |
| 2013/0079191 A1 | 3/2013 | Lohr |
| 2013/0080006 A1 | 3/2013 | Vasiliotis et al. |
| 2013/0095977 A1 | 4/2013 | Smithson et al. |
| 2013/0102434 A1 | 4/2013 | Nichols et al. |
| 2013/0106258 A1 | 5/2013 | Miller |

FOREIGN PATENT DOCUMENTS

| | | |
|---|---|---|
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 263566 | 1/1989 |
| DE | 39 40 919 A1 | 6/1991 |
| DE | 4120540 C1 | 11/1992 |
| DE | 19851738 A | 5/2000 |
| DE | 10155372 A1 | 5/2003 |
| DE | 10261372 A1 | 7/2003 |
| EP | 0 432 742 | 12/1990 |
| EP | 0528381 | 2/1993 |
| EP | 0528382 | 2/1993 |
| EP | 635639 A1 | 1/1995 |
| EP | 0638741 | 2/1995 |
| EP | 0976956 | 2/2000 |
| EP | 1010612 | 6/2000 |
| EP | 1136724 | 9/2001 |
| EP | 1366978 | 3/2003 |
| EP | 1362783 | 11/2003 |
| EP | 1452441 | 9/2004 |
| EP | 1518785 | 3/2005 |
| FR | 620375 | 4/1927 |
| FR | 2460427 A | 1/1981 |
| FR | 2590638 | 5/1987 |
| GB | 14132 | 5/1910 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 42-2844 | 2/1967 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53 048166 | 1/1978 |
| JP | 55-135259 | 4/1979 |
| JP | A-S56-127852 | 10/1981 |
| JP | 58065361 | 4/1983 |
| JP | 59069565 | 4/1984 |
| JP | 60-247011 | 12/1985 |
| JP | 61031754 | 2/1986 |
| JP | 61-144466 | 7/1986 |
| JP | 61-173722 | 10/1986 |
| JP | 63-219953 | 9/1988 |
| JP | 63219953 | 9/1988 |
| JP | 63-160465 | 10/1988 |
| JP | 02157483 | 6/1990 |
| JP | 02271142 | 6/1990 |
| JP | 04-166619 | 6/1992 |
| JP | 04-272553 | 9/1992 |
| JP | 52-35481 | 9/1993 |
| JP | 7-42799 | 2/1995 |
| JP | 7-139600 | 5/1995 |
| JP | 08170706 A | 7/1996 |
| JP | 09024743 A | 1/1997 |
| JP | 09-089064 | 3/1997 |
| JP | 10-115356 | 5/1998 |
| JP | 411063130 | 3/1999 |
| JP | 11-257479 | 9/1999 |
| JP | 2000-46135 | 2/2000 |
| JP | 2001-27298 | 1/2001 |
| JP | 2001521109 A | 11/2001 |
| JP | 2002-147558 | 5/2002 |
| JP | 2002-250421 | 6/2002 |
| JP | 2002-291272 | 10/2002 |
| JP | 2003-028257 | 1/2003 |
| JP | 2003-56662 | 2/2003 |
| JP | 2003-524119 | 8/2003 |
| JP | 2003-336732 | 11/2003 |
| JP | 2004162652 A | 6/2004 |
| JP | 8-247245 | 9/2004 |
| JP | 2005/240928 A | 9/2005 |
| JP | 2006015025 | 1/2006 |
| JP | 2007-535715 | 12/2007 |
| JP | 2008-002687 | 1/2008 |
| JP | 03-149442 | 1/2009 |
| JP | 2010069005 | 4/2010 |
| NE | 98467 | 7/1961 |
| TW | 582363 | 4/2004 |
| TW | 590955 | 6/2004 |
| TW | I235214 | 1/2005 |
| TW | 200637745 A | 11/2006 |
| WO | WO 01/73319 | 10/2001 |
| WO | WO 02/088573 | 11/2002 |
| WO | WO 03/086849 | 10/2003 |
| WO | WO 03100294 | 12/2003 |
| WO | WO 2005/083305 | 9/2005 |
| WO | WO 2008/002457 | 1/2008 |
| WO | WO 2008/057507 | 5/2008 |
| WO | WO 2008/095116 | 8/2008 |
| WO | WO 2008/100792 | 8/2008 |
| WO | WO 2008/101070 | 8/2008 |
| WO | WO 2008/131353 | 10/2008 |
| WO | WO 2008/154437 | 12/2008 |
| WO | WO 2009/006481 | 1/2009 |
| WO | WO 2009/148461 | 12/2009 |
| WO | WO 2009/157920 | 12/2009 |
| WO | WO 2010/017242 | 2/2010 |
| WO | WO 2010/024809 | 3/2010 |
| WO | WO 2010/044778 | 4/2010 |
| WO | WO 2011/101991 | 8/2011 |

OTHER PUBLICATIONS

International Search Report and Written Opinion dated Apr. 7, 2009 for PCT Application No. PCT/US2008/087034.
Pohl, Brad., CVT Split Power Transmissions, A Configuration versus Performance Study with an Emphasis on the Hydromechanical Type, Society of Automotive Engineers, Mar. 4, 2002, pp. 11 pages.
Pohl, et al., Configuration Analysis of a Spherical Traction Drive CVT/IVT, SAE International, 2004 International Continuously Variable and Hybrid Transmission Congress, Sep. 23, 2004, pp. 6 pages.
Smithson et al., Scalability for an Alternative Rolling Traction CVT, Society of Automotive Engineers, Mar. 8, 2004, pp. 6 pages.
Office Action dated Feb. 12, 2010 from Japanese Patent Application No. 2009-294086.
Office Action dated Feb. 17, 2010 from Japanese Patent Application No. 2006-508892.
Office Action dated Jan. 9, 2012 for U.S. Appl. No. 12/335,810.
Chinese Office Action dated Mar. 5, 2013 for Chinese Patent Application No. 200880125031.2.
Japanese Office Action dated Feb. 19, 2013 for Japanese Patent Application No. 2010-539711.

* cited by examiner

| 502 | 506 | 508 | 510 | 504 |
|---|---|---|---|---|
| 0 | 0.00 | 0.5 | 0.0 | 12 |
| 3 | 0.02 | 0.5 | 2.2 | 12 |
| 5 | 0.04 | 0.5 | 4.5 | 12 |
| 8 | 0.07 | 0.5 | 6.7 | 12 |
| 10 | 0.09 | 0.5 | 9.0 | 12 |
| 13 | 0.11 | 0.5 | 11.2 | 12 |
| 15 | 0.13 | 0.5 | 13.4 | 12 |
| 18 | 0.16 | 0.5 | 15.7 | 12 |
| 20 | 0.18 | 0.5 | 17.9 | 12 |
| 23 | 0.20 | 0.5 | 20.2 | 12 |
| 25 | 0.22 | 0.5 | 22.4 | 12 |
| 28 | 0.25 | 0.5 | 24.7 | 12 |
| 30 | 0.27 | 0.5 | 26.9 | 12 |
| 33 | 0.29 | 0.5 | 29.1 | 12 |
| 35 | 0.31 | 0.5 | 31.4 | 12 |
| 38 | 0.34 | 0.5 | 33.6 | 12 |
| 40 | 0.36 | 0.5 | 35.9 | 12 |
| 43 | 0.38 | 0.5 | 38.1 | 12 |
| 45 | 0.40 | 0.5 | 40.3 | 12 |
| 48 | 0.43 | 0.5 | 42.6 | 12 |
| 50 | 0.45 | 0.5 | 44.8 | 12 |
| 53 | 0.47 | 0.5 | 47.1 | 12 |
| 55 | 0.49 | 0.5 | 49.3 | 12 |
| 58 | 0.52 | 0.52 | 50.0 | 24 |
| 60 | 0.54 | 0.54 | 50.0 | 40 |
| 63 | 0.56 | 0.56 | 50.0 | 56 |
| 65 | 0.58 | 0.58 | 50.0 | 71 |
| 68 | 0.61 | 0.61 | 50.0 | 85 |
| 70 | 0.63 | 0.63 | 50.0 | 99 |
| 73 | 0.65 | 0.65 | 50.0 | 113 |
| 75 | 0.67 | 0.67 | 50.0 | 126 |
| 78 | 0.69 | 0.69 | 50.0 | 138 |
| 80 | 0.72 | 0.72 | 50.0 | 151 |
| 83 | 0.74 | 0.74 | 50.0 | 162 |
| 85 | 0.76 | 0.76 | 50.0 | 174 |
| 88 | 0.78 | 0.78 | 50.0 | 185 |
| 90 | 0.81 | 0.81 | 50.0 | 196 |
| 93 | 0.83 | 0.83 | 50.0 | 206 |
| 95 | 0.85 | 0.85 | 50.0 | 216 |
| 98 | 0.87 | 0.87 | 50.0 | 226 |

| 502 | 506 | 508 | 510 | 504 |
|---|---|---|---|---|
| 100 | 0.90 | 0.90 | 50.0 | 236 |
| 103 | 0.92 | 0.92 | 50.0 | 246 |
| 105 | 0.94 | 0.94 | 50.0 | 255 |
| 108 | 0.96 | 0.96 | 50.0 | 264 |
| 110 | 0.99 | 0.99 | 50.0 | 273 |
| 113 | 1.01 | 1.01 | 50.0 | 281 |
| 115 | 1.03 | 1.03 | 50.0 | 290 |
| 118 | 1.05 | 1.05 | 50.0 | 298 |
| 120 | 1.08 | 1.08 | 50.0 | 306 |
| 123 | 1.10 | 1.10 | 50.0 | 314 |
| 125 | 1.12 | 1.12 | 50.0 | 322 |
| 128 | 1.14 | 1.14 | 50.0 | 329 |
| 130 | 1.17 | 1.17 | 50.0 | 337 |
| 133 | 1.19 | 1.19 | 50.0 | 344 |
| 135 | 1.21 | 1.21 | 50.0 | 351 |
| 138 | 1.23 | 1.23 | 50.0 | 358 |
| 140 | 1.26 | 1.26 | 50.0 | 365 |
| 143 | 1.28 | 1.28 | 50.0 | 372 |
| 145 | 1.30 | 1.30 | 50.0 | 379 |
| 148 | 1.32 | 1.32 | 50.0 | 385 |
| 150 | 1.34 | 1.34 | 50.0 | 392 |
| 153 | 1.37 | 1.37 | 50.0 | 398 |
| 155 | 1.39 | 1.39 | 50.0 | 404 |
| 158 | 1.41 | 1.41 | 50.0 | 410 |
| 160 | 1.43 | 1.43 | 50.0 | 416 |
| 163 | 1.46 | 1.46 | 50.0 | 422 |
| 165 | 1.48 | 1.48 | 50.0 | 428 |
| 168 | 1.50 | 1.50 | 50.0 | 434 |
| 170 | 1.52 | 1.52 | 50.0 | 440 |
| 173 | 1.55 | 1.55 | 50.0 | 445 |
| 175 | 1.57 | 1.57 | 50.0 | 451 |
| 178 | 1.59 | 1.59 | 50.0 | 456 |
| 180 | 1.61 | 1.61 | 50.0 | 461 |
| 183 | 1.64 | 1.615 | 50.7 | 462 |
| 185 | 1.66 | 1.615 | 51.4 | 462 |
| 188 | 1.68 | 1.615 | 52.0 | 462 |
| 190 | 1.70 | 1.615 | 52.7 | 462 |
| 193 | 1.73 | 1.615 | 53.4 | 462 |
| 195 | 1.75 | 1.615 | 54.1 | 462 |
| 198 | 1.77 | 1.615 | 54.8 | 462 |
| 200 | 1.79 | 1.615 | 55.5 | 462 |

| 503 | 509 | 511 | 505 |
|---|---|---|---|
| 0 | 0.6 | 0.0 | 82 |
| 3 | 0.6 | 1.9 | 82 |
| 5 | 0.6 | 3.7 | 82 |
| 8 | 0.6 | 5.6 | 82 |
| 10 | 0.6 | 7.5 | 82 |
| 13 | 0.6 | 9.3 | 82 |
| 15 | 0.6 | 11.2 | 82 |
| 18 | 0.6 | 13.1 | 82 |
| 20 | 0.6 | 14.9 | 82 |
| 23 | 0.6 | 16.8 | 82 |
| 25 | 0.6 | 18.7 | 82 |
| 28 | 0.6 | 20.5 | 82 |
| 30 | 0.6 | 22.4 | 82 |
| 33 | 0.6 | 24.3 | 82 |
| 35 | 0.6 | 26.2 | 82 |
| 38 | 0.6 | 28.0 | 82 |
| 40 | 0.6 | 29.9 | 82 |
| 43 | 0.6 | 31.8 | 82 |
| 45 | 0.6 | 33.6 | 82 |
| 48 | 0.6 | 35.5 | 82 |
| 50 | 0.6 | 37.4 | 82 |
| 53 | 0.6 | 39.2 | 82 |
| 55 | 0.6 | 41.1 | 82 |
| 58 | 0.6 | 43.0 | 82 |
| 60 | 0.6 | 44.8 | 82 |
| 63 | 0.6 | 46.7 | 82 |
| 65 | 0.6 | 48.6 | 82 |
| 68 | 0.6 | 50.4 | 82 |
| 70 | 0.6 | 52.3 | 82 |
| 73 | 0.6 | 54.2 | 82 |
| 75 | 0.6 | 56.0 | 82 |
| 78 | 0.6 | 57.9 | 82 |
| 80 | 0.6 | 59.8 | 82 |
| 83 | 0.6 | 61.6 | 82 |
| 85 | 0.6 | 63.5 | 82 |
| 88 | 0.6 | 65.4 | 82 |
| 90 | 0.6 | 67.2 | 82 |
| 93 | 0.6 | 69.1 | 82 |
| 95 | 0.6 | 71.0 | 82 |
| 98 | 0.6 | 72.9 | 82 |

| 503 | 509 | 511 | 505 |
|---|---|---|---|
| 100 | 0.6 | 74.7 | 82 |
| 103 | 0.9 | 51.1 | 238 |
| 105 | 0.9 | 52.3 | 238 |
| 108 | 0.9 | 53.5 | 238 |
| 110 | 0.9 | 54.8 | 238 |
| 113 | 0.9 | 56.0 | 238 |
| 115 | 0.9 | 57.3 | 238 |
| 118 | 0.9 | 58.5 | 238 |
| 120 | 0.9 | 59.8 | 238 |
| 123 | 0.9 | 61.0 | 238 |
| 125 | 0.9 | 62.3 | 238 |
| 128 | 0.9 | 63.5 | 238 |
| 130 | 0.9 | 64.8 | 238 |
| 133 | 0.9 | 66.0 | 238 |
| 135 | 0.9 | 67.2 | 238 |
| 138 | 0.9 | 68.5 | 238 |
| 140 | 0.9 | 69.7 | 238 |
| 143 | 0.9 | 71.0 | 238 |
| 145 | 0.9 | 72.2 | 238 |
| 148 | 0.9 | 73.5 | 238 |
| 150 | 0.9 | 74.7 | 238 |
| 153 | 1.4 | 48.8 | 407 |
| 155 | 1.4 | 49.6 | 407 |
| 158 | 1.4 | 50.4 | 407 |
| 160 | 1.4 | 51.2 | 407 |
| 163 | 1.4 | 52.0 | 407 |
| 165 | 1.4 | 52.8 | 407 |
| 168 | 1.4 | 53.6 | 407 |
| 170 | 1.4 | 54.4 | 407 |
| 173 | 1.4 | 55.2 | 407 |
| 175 | 1.4 | 56.0 | 407 |
| 178 | 1.4 | 56.8 | 407 |
| 180 | 1.4 | 57.6 | 407 |
| 183 | 1.4 | 58.4 | 407 |
| 185 | 1.4 | 59.2 | 407 |
| 188 | 1.4 | 60.0 | 407 |
| 190 | 1.4 | 60.8 | 407 |
| 193 | 1.4 | 61.6 | 407 |
| 195 | 1.4 | 62.4 | 407 |
| 198 | 1.4 | 63.2 | 407 |
| 200 | 1.4 | 64.0 | 407 |

AUTOMATIC TRANSMISSIONS AND METHODS THEREFOR

CROSS REFERENCE TO RELATED APPLICATIONS

This application is a continuation of U.S. patent application Ser. No. 12/335,810, filed Dec. 16, 2008 and scheduled to issue on Nov. 27, 2012 as U.S. Pat. No. 8,321,097, which claims the benefit of U.S. Provisional Patent Application No. 61/016,305, filed on Dec. 21, 2007, both of which are hereby incorporated by reference in their entirety.

BACKGROUND OF THE INVENTION

1. Field of the Invention

The present invention relates generally to mechanical transmissions, and more specifically to automatic transmissions and methods of controlling said transmissions.

2. Related Technology

Automatic transmissions are found in a variety of machines. However, in certain fields manual operation of the transmission is still prevalent. For example, in the bicycle industry, most bicycles are configured for manual operation of the transmission, which generally involves manually actuating levers, cables, and linkages to cause a chain to move from one rear sprocket to another. However, an ongoing need has been manifested for systems and corresponding methods to facilitate the automatic control of the transmission of a bicycle.

Inventive embodiments disclosed here address this need, among others, by providing systems for, and methods of, automatically controlling transmissions, which systems and methods in some cases are particularly suitable for human powered vehicles such as bicycles.

SUMMARY OF THE INVENTION

The systems and methods described herein have several features, no single one of which is solely responsible for the overall desirable attributes. Without limiting the scope as expressed by the claims that follow, the more prominent features of certain embodiments of the invention will now be discussed briefly. After considering this discussion, and particularly after reading the section entitled "Detailed Description of the Preferred Embodiments," one will understand how the features of the systems and methods provide several advantages over related traditional systems and methods.

In one aspect the invention addresses a method of automatically controlling a ball-planetary transmission of a bicycle. The method involves receiving an input associated with a target user pedaling speed, determining a speed of the bicycle, and determining a target transmission ratio based at least in part on the target user pedaling speed and the determined speed of the bicycle. The method can also include adjusting a transmission ratio of the transmission to be substantially equal to the target transmission ratio.

In another aspect, the invention is directed to a method of automatically controlling a ball-planetary transmission of a bicycle. The method includes receiving an input associated with a target user pedaling speed, determining a speed of the bicycle, and based upon the target user pedaling speed and the determined speed of the bicycle, adjusting a speed ratio of the bicycle to maintain a user pedaling speed within a band of the target user pedaling speed.

Yet another aspect of the invention relates to a method of automatically controlling a ball-planetary transmission of a bicycle. The method involves providing an input associated with a target user pedaling speed, determining a speed of the bicycle, and identifying a target encoder position associated with the speed of the bicycle. The method can further include actuating a servo to achieve the target encoder position.

In one instance, the invention is concerned with a system for automatically shifting a ball-planetary bicycle transmission. The system includes a speed sensor configured to detect a speed of the bicycle, a processor configured to receive input from the speed sensor, and a data input interface configured to provide cadence data to the processor, said cadence data indicative of a desired, constant input pedaling speed. The system can additionally have a memory in communication with the processor, the memory having stored therein one or more maps correlating bicycle speeds with speed ratios. In one embodiment, the system includes a logic module in communication with the processor, the logic module configured to cooperate with the processor to determine from said maps a target speed ratio based on a bicycle speed and a desired, constant input pedaling speed. In some embodiments, the system has an actuator, in communication with the processor, the actuator configured to adjust a speed ratio of the transmission to be substantially equal to the determined target speed ratio.

Another aspect of the invention addresses a bicycle having a ball-planetary transmission and a system for automatically shifting the ball-planetary transmission. In one embodiment, the system has a speed sensor configured to detect a speed of the bicycle. The system has a processor configured to receive input from the speed sensor. In some embodiments, the system includes a data input interface configured to provide cadence data to the processor. The cadence data is indicative of a desired, constant input pedaling speed. The system can include a memory in communication with the processor. In one embodiment, the memory has stored therein one or more maps correlating bicycle speeds with speed ratios. The system includes a logic module in communication with the processor. The logic module is configured to cooperate with the processor to determine from the maps a target speed ratio based on a bicycle speed and a desired, constant input pedaling speed. The system can also include an actuator in communication with the processor. The actuator is configured to adjust a speed ratio of the transmission to be substantially equal to the determined target speed ratio.

Yet another aspect of the invention concerns an automatic shifting bicycle system having a ball-planetary transmission having a shift rod. In one embodiment, the system has an actuator operably coupled to the shift rod. The system includes a processor in communication with the actuator. The system also includes a memory in communication with the processor. In some embodiments, the memory has at least one table correlating a position of the actuator to the transmission ratio.

These and other improvements will become apparent to those skilled in the art as they read the following detailed description and view the enclosed figures.

BRIEF DESCRIPTION OF THE DRAWINGS

FIG. 5A is an exemplary data structure that can be used with inventive embodiments of transmission control methods and systems described herein.

FIG. 5B is yet another exemplary data structure that can be used with the inventive embodiments of transmission control methods and systems described herein.

DETAILED DESCRIPTION OF THE PREFERRED EMBODIMENTS

Preferred embodiments of the present invention will now be described with reference to the accompanying figures, wherein like numerals refer to like elements throughout. The inventive systems and methods described here can be generally used with transmissions and variators disclosed in U.S. Pat. Nos. 6,241,636; 6,419,608; 6,689,012; and 7,011,600. Likewise, the inventive systems and methods disclosed here are related to transmissions, controllers, user interfaces, and vehicles or technology applications described in U.S. patent applications Ser. Nos. 11/243,484; 11/543,311; 60/887,767; 60/895,713; and 60/914,633. The entire disclosure of each of these patents and patent applications is hereby incorporated herein by reference.

Figure 1:
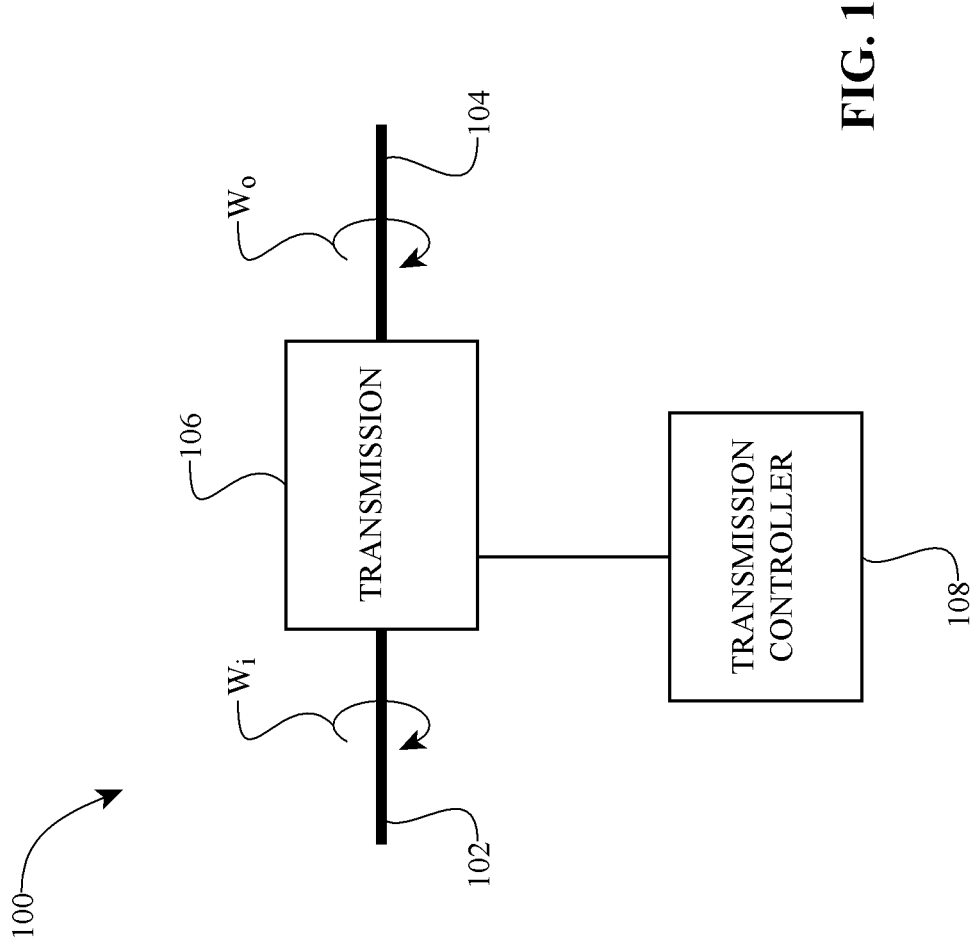
FIG. 1 is a block diagram of a transmission control system that employs inventive embodiments described herein.

With reference to FIG. 1, a transmission control system 100 for maintaining a speed input constant is described now. In one embodiment, the system 100 includes an input shaft 102 and an output shaft 104 coupled to a transmission 106, which is coupled to a transmission controller 108. The input shaft 102 has an input speed $w_i$, and the output shaft 106 has an output speed $w_o$. A transmission speed ratio (SR) is defined as the output speed $w_o$ divided by the input speed $w_i$ (or equivalently, $w_i = w_o/SR$). During operation of the control system 100, in certain embodiments, as the output speed $w_o$ changes, the transmission controller 108 adjusts the SR to keep the input speed $w_i$ at a substantially constant value, or within a predetermined band of the input speed $w_i$. Thus, in one embodiment, given a desired, constant input speed $w_i$, and a detected output speed $w_o$ during operation, the controller 108 adjusts the transmission 104 to operate at a predetermined SR associated with the detected output speed $w_o$.

The transmission 106 can be a conventional range box, gear box, planetary-gear-based transmission, traction-based transmission (such as a toroidal transmission, a ball planetary transmission, or any other continuously variable or infinitely variable transmission), or any combination thereof. The transmission controller 108 can include various integrated circuits, computer processors, logic modules, input and output interfaces, data structures, digital memory, power sources, actuators, sensors, encoders, servo mechanisms, etc. Preferably, in one embodiment, the transmission controller 108 includes a data structure that correlates vehicle output speed $w_o$ to data associated with SR of the transmission 106.

Figure 2:
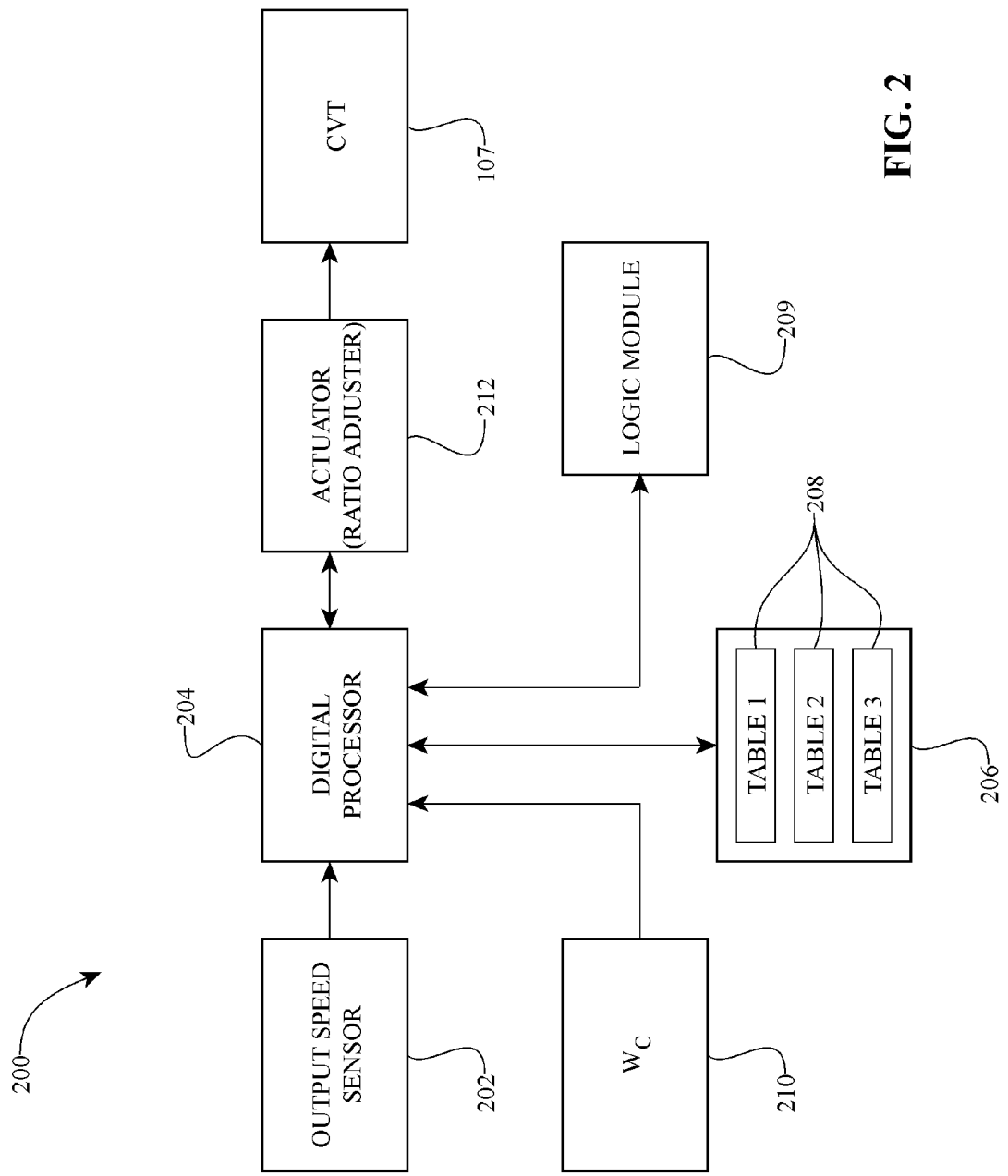
FIG. 2 is a block diagram of a yet another transmission control system incorporating inventive embodiments described herein.

Passing to FIG. 2 now, an automatic transmission control system 200 includes a speed sensor 202 coupled to a digital processor 204. A digital memory 206 is placed in communication with the digital processor 204. The digital memory 206 has stored therein one or more matrices, or tables, or maps (hereinafter "tables 208") of output speed $w_o$ correlated with SR. In some instances, a logic module 209 is placed in communication with the digital process 204; the logic module 209 is provided with suitable programming and/or algorithms to cooperate with the digital processor 204 in processing inputs and providing outputs, such as determining a SR based on a sensed output speed $w_o$ and a data input associated with a desired constant input speed In one embodiment, the system 200 includes an input device 210 coupled to the digital processor 204 to provide to the digital processor 204 a data input associated with a desired constant input speed target $w_c$. In some embodiments of the system 200, an actuator 212 (or ratio adjuster mechanism) is coupled to the digital processor 204, whereby the digital processor 204 can control the actuator 212 to adjust the SR of a transmission 107, which in one instance can be a continuously variable transmission (CVT).

During operation, the speed sensor 202 provides to the digital processor 204 an indication of the output speed $w_o$. The input device 210 provides to the digital processor 204 a target input speed $w_c$. The digital processor 204, in cooperation with the logic module 209 and/or the tables 208, determines a SR associated with the indicated output speed $w_o$ and the target input speed $w_c$. The digital processor 204 then commands the actuator 212 to adjust the operating speed ratio of the transmission 107 to the determined SR. In some embodiments, the target input speed $w_c$ can be substantially constant over a range of output speeds $w_o$, resulting in the rider pedaling at a substantially constant cadence. In one embodiment, the input device 210 provides a map, or a selection indicative of such a map, of predetermined input speed $w_c$ values associated with output speed $w_o$ values.

Figure 3:
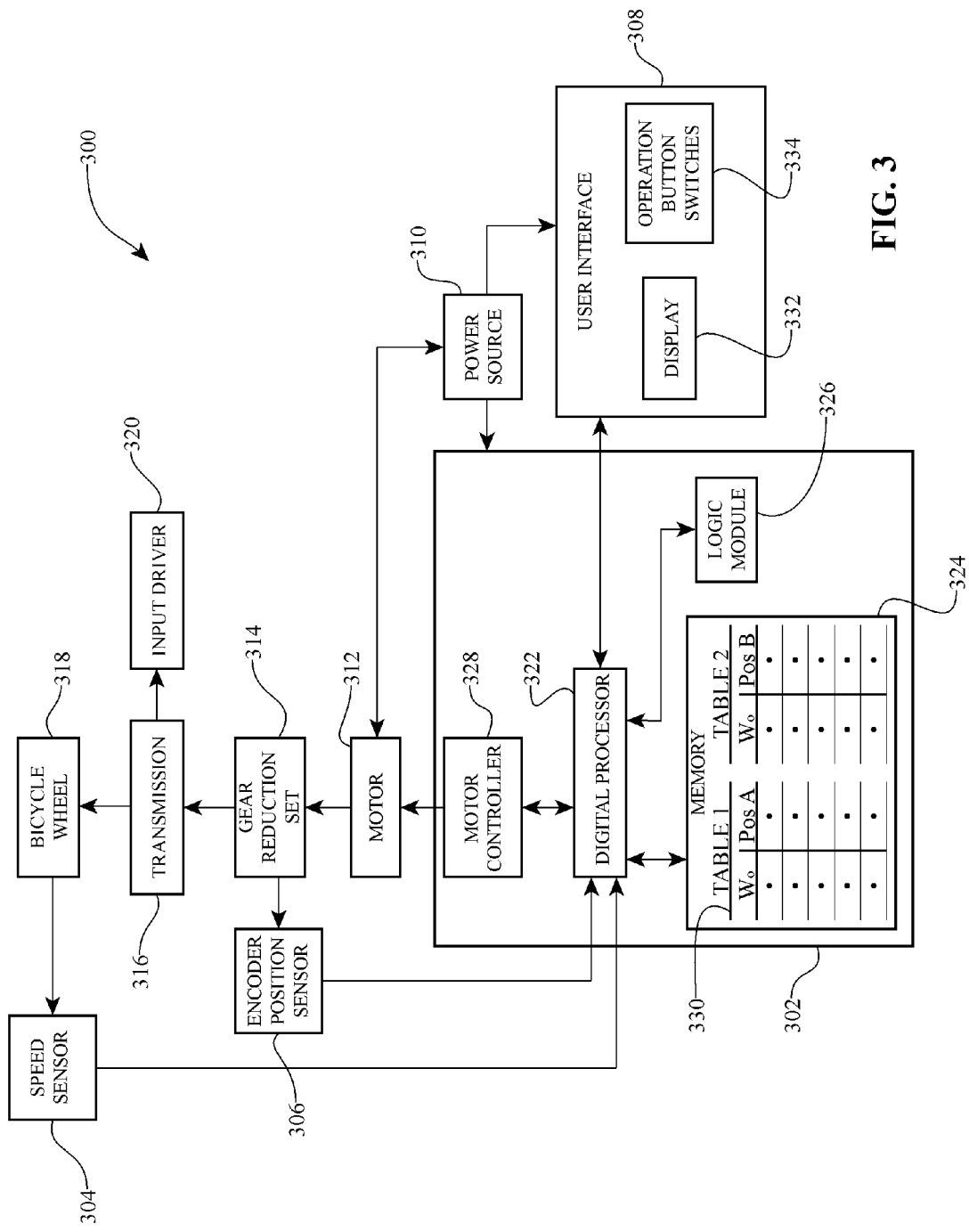
FIG. 3 is a block diagram of an automatic bicycle transmission shifting system in accordance with inventive embodiments described herein.

Referencing FIG. 3 now, an automatic shifting bicycle system 300 is configured to keep a rider cadence within a narrow band of a rider selected cadence level. As used here, the term "cadence" refers to the pedaling speed of the rider (which is equivalent to the rotational speed of the bicycle cranks). In one embodiment, the bicycle system 300 includes a control unit 302 in communication with a speed sensor 304, an encoder position sensor 306, a user interface 308, a power source 310, and a reversible motor 312. In some instances, a gear reduction set 314 is coupled between the reversible motor 312 and a transmission 316. A bicycle wheel 318 and an input driver 320 are operationally coupled to the transmission 316. In some embodiments, the encoder position sensor 306 is coupled to the gear reduction set 314, and the speed sensor 304 operationally couples to the bicycle wheel 318 or to any rotating component associated therewith. The input driver 320 can be, or is operationally coupled to, a rear wheel sprocket, a chain, a front sprocket, a one-way clutch, a freewheel, etc. The power source 310 can be coupled to, or integrated with, anyone of the control unit 302, user interface 308, and motor 312. The power source 310 can be, for example, a battery, a dynamo, or any other suitable power generating or energy storing device.

In some embodiments, the control unit 302 includes a digital processor 322 that is in communication with a memory 324 and a logic module 326. The control unit 302 can additionally include a motor controller 328 that is in communication with the digital processor 322. It should be noted that the digital processor 322, memory 324, logic module 326, and the motor controller 328 need not be all integrated into one device or housed in a common housing. That is, in some embodiments, any one of the digital processor 322, memory 324, logic module 326, and motor controller 328 can be remotely located from any of the others; communication between or among them can be wired or wireless. The memory 324 is preferably provided with one more tables 330 having data that correlates values of output speed $w_o$ to values of SR. In one embodiment, as illustrated in FIG. 3, values of SR are represented by values associated with encoder positions; that is, an encoder position is representative of at least one SR state of the transmission 316. As used here, the term "encoder position" refers to a state of a detector and/or a sensor that is representative of a position of a component of the transmission 316, or of an internal or external component coupled to such a component of the transmission 316. For example, in one case, the encoder position is indicative of an angular position of a gear coupled to a shift rod of the transmission 316 such that the encoder position is indicative of an angular or axial position of the shift rod.

In one embodiment, the user interface 308 includes a display 332 and one or more operation button switches 334. The display 332 can be any suitable screen, or the like, for presenting a variety of graphical and/or alphanumerical information. The operation switches 334 can include one or more buttons or manipulators configured to allow an operator to enter data, make selections, or change values, for example. In some embodiments, the operation switches 334 allow the rider to select among modes of operation (for example, automatic continuous ratio adjustment, automatic stepped ratio adjustment, manual, etc.). The operation switches 334 can be configured to allow the rider to command different cadence levels while in automatic mode, or to request a SR adjustment while in manual mode.

Still referring to FIG. 3, during operation of the automatic shifting bicycle system 300, the user can use the user interface 308 to adjust the desired cadence level while operating the bicycle on a routine ride. The control unit 302 receives the cadence input, queries the memory 324, and in cooperation with the logic module 326 selects a corresponding table 330 associated with the cadence input. Hence, during normal operation of the bicycle, the user can select from among predetermined cadence level maps (that is, tables 330) by indicating a desired cadence value. The speed sensor 304 detects the speed of the bicycle wheel 318, which in some instances involves detecting a rotational speed of some other rotating component (such as the spokes of the bicycle wheel 318) that rotates at a speed indicative of the rotational speed of the bicycle wheel 318. Based upon the indicated cadence value and the detected speed of the bicycle wheel 318, the control unit 302 identifies from the tables 330 a SR, or encoder position, associated with the sensed speed of the bicycle wheel 318. The control unit 302, in cooperation with the motor controller 328, actuates the reversible motor 312 to adjust the transmission 316 to attain a speed ratio that substantially matches the SR identified from the table 330. As the control unit 302 adjusts the SR in response to changes to the speed of the bicycle wheel 318, the cadence of the rider is controlled to stay within a band of the rider's desired cadence level. For example, in some instances, the actual cadence level of the rider during steady state operation can be maintained at the desired cadence level plus or minus 10 revolutions-per-minute (rpm), or +/−5-rpm, or less than +/−2-rpm. In some embodiments, the automatic shifting bicycle system 300 can be configured with multiple automatic modes. The modes can be predetermined to control a rider's cadence in any desired manner over a range of output speeds. For example, in one such mode, a table 330 can be provided with cadence values, output speed values, and SR values associated such that over a first range of output speeds the cadence is controlled to a certain cadence value or a specific range of cadence values, while in a second range of output speeds the cadence is controlled to yet another cadence value or yet another specific range of cadence values.

Figure 4:
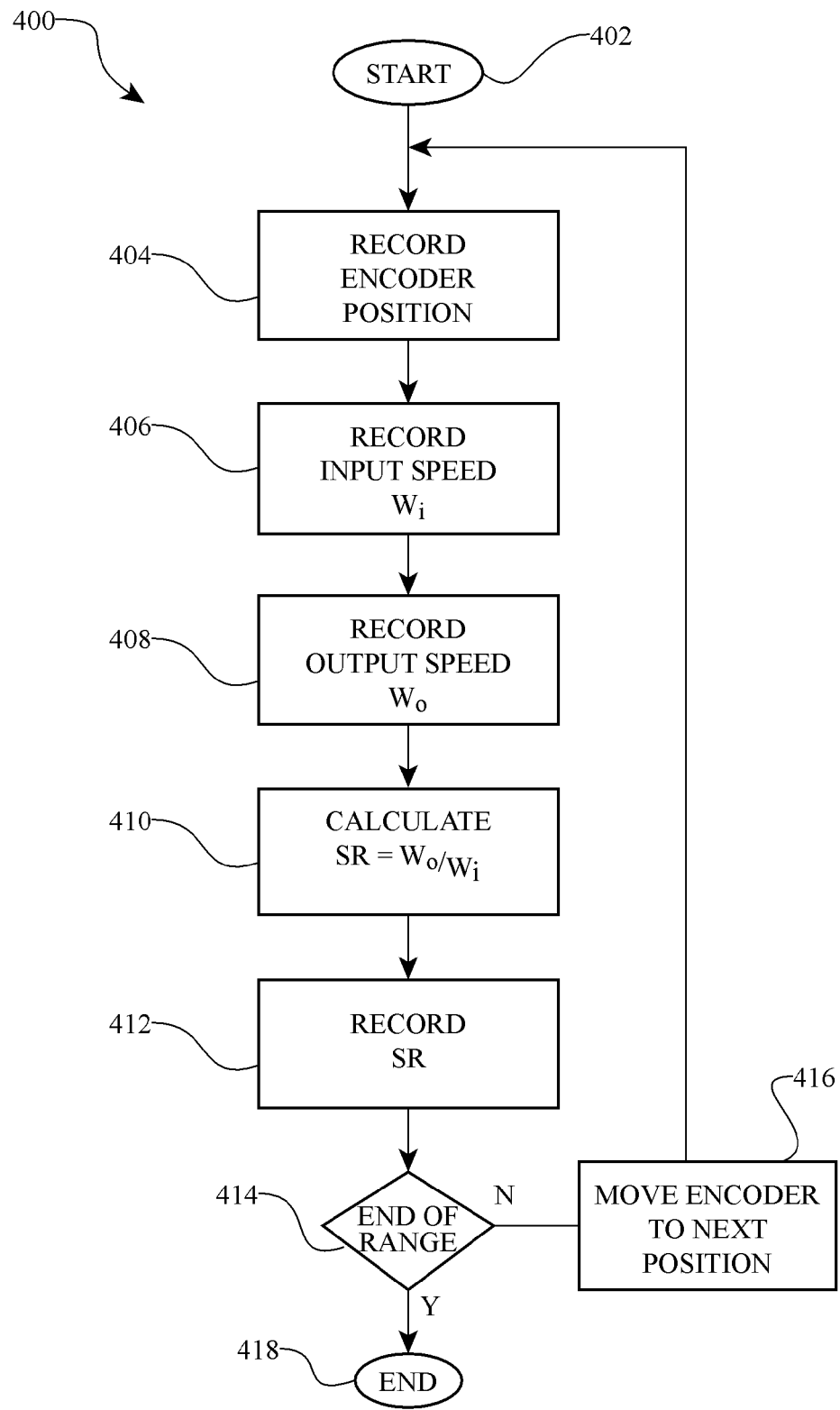
FIG. 4 is a process flow chart of a method that can be used to generate data structures that can be used with inventive embodiments of transmission control methods and systems described herein.

Referring to FIG. 4 now, a process 400 for generating data structures that can be used with a table 330 is described. In one embodiment, an exemplary transmission 316 is a compound variable planetary (CVP) of the ball-planetary, traction CVT type. An example of such devices is a NuVinci™ transmission. In such a transmission 316, the speed ratio between the speed of an input traction ring and the speed of an output traction ring is determined, at least in part, by a position of a shift rod. Hence, a position of an encoder of a servo mechanism can be correlated with a position of the shift rod, which effectively means that a position of the encoder is correlated with a speed ratio of the transmission 316. The process 400 starts at a state 402 after a servo mechanism having an encoder has been coupled to a transmission 316. At a state 404, an encoder position is recorded (and preferably stored in a data structure will be part of the table 330, for example). Moving to a state 406, an input speed of the transmission 316 is recorded, and at a state 408 an output speed of the transmission 316 is recorded. Passing to a state 410, a SR is calculated by dividing the output speed $w_o$ by the input speed $w_i$. At a state 412, the SR is recorded (and preferably stored in a data structure that will be part of the table 330).

The process 400 then moves to a decision state 414 wherein it is determined whether the end of the range of the transmission 316 has been reached. For the current purposes, it is assumed that the range of encoder positions can be coextensive with the range of speed ratios of the transmission 316. When the transmission 316 is a continuously variable transmission there is an infinite number of transmission speed ratios within a given range; however, as a practical matter, both the encoder positions and the speed ratios of the transmission 316 will be each a finite set. If the end of the range of the transmission 316 has been reached, the process 400 continues to a state 416 at which the encoder is moved to the next encoder position. The process 400 then returns to the state 404 and records the new encoder position. The process 400 then repeats until at the decision state 414 it is determined that the end of the range of the transmission 316 has been reached, in which case the process 400 ends at a state 418.

Thus, a result of the process 400 is data structures correlating encoder positions with empirically determined speed ratios of the transmission 316. For a certain class of continuously variable transmissions, the speed ratio and encoder position data can be fit to a curve generally described by $SR=A*exp(B*p)$, wherein A and B are constants or parameters characteristic of individual devices, and p is the encoder position. For example, for an exemplary CVP, $A=0.4844$ and $B=0.0026$. The data tables 330 can incorporate the encoder position and speed ratio data generated by the process 400.

Passing to FIG. 5A, an exemplary table 330 is shown and will now be discussed. The table 330 can include a vehicle speed data structure 502 with data associated with a vehicle speed. The table 330 can additionally include an encoder position data structure 504 with data associated with an encoder position. The vehicle speed data structure 502 and the encoder position data structure 504 correspond to one another as forming columns and rows of the table 330. Given a target constant input speed, a corresponding SR can be determined and tabulated as a requested SR data structure 506. In some cases, however, a requested SR is not available because, for example, such a SR is lower than the lowest SR the transmission 316 can provide. In such cases, the requested SR data structure 506 is used to produce a possible SR data structure 508. In the example illustrated in FIG. 5, the lowest possible SR available from the transmission 316 is 0.5; consequently, all the values of the requested SR data structure 506 below 0.5 are represented in the possible SR data structure 508 as 0.5. It follows that the corresponding lowest encoder position is then associated with the lowest possible SR ratio value in the table 330. Similarly, in some cases, the requested SR is higher than the highest possible SR of the transmission 316; hence, the entries in the requested SR data structure 506 that are higher than the highest possible SR of the transmission 316 are represented by the highest SR of the transmission 316 (which in the illustrative example is 1.615).

Of course, those values in the requested SR data structure 506 that fall within the possible range of speed ratios of the transmission 316 correspond to identical entries in the possible SR data structure 508. It should be noted that, other than for values falling below and above the possible range of the transmission 316, in the table 330 there is a unique encoder position value in the encoder position data structure 505 that corresponds to a unique SR value in the possible SR data structure 508. However, a speed range (rather than a unique speed) corresponds to a given encoder position. Hence, for a wheel speed of 58-rpm and less than 60-rpm in the vehicle speed data structure 502, there corresponds only one value of encoder position (that is, 24) and one value of possible speed ratio (that is, 0.52). The illustrative table 330 includes a cadence data structure 510 having data associated with a calculated cadence (using the expression $w_i = w_o/SR$). The cadence structure 510 need not be part of the table 330; however, the inclusion of the cadence structure 510 in the illustrative table 330 facilitates a demonstration of how the cadence can be maintained constant (as shown by the constant value of 50 in the cadence data structure 510) over the possible range of speed ratios of the transmission 316.

FIG. 5B illustrates yet another example of a map or table 331 of output speeds to SR that yield a predetermined rider cadence. In one embodiment, the table 331 includes a vehicle speed data structure 503 having data associated with an output, or vehicle, speed. The table 331 additionally includes an encoder position data structure 505 with data associated with an encoder position. The vehicle speed data structure 503 and the encoder position data structure 505 correspond to one another as forming columns and rows of the table 331. Given a desired, predetermined map of target input speeds, a possible SR data structure 509 is produced. A cadence data structure 511, which need not be part of the table 331, illustrates how the cadence is controlled over the range of vehicle speeds associated with the vehicle speed data structure 503. As can be seen in FIG. 5B, the cadence is allowed to rise to a first level (that is, 74.7-rpm), the SR is adjusted to 0.9 from 0.6, as the output speed changes from 0 to 100-rpm. The cadence drops to 51.1-rpm and is allowed to rise to 74.7-rpm again before at an output speed of 153-rpm the SR is adjusted from 0.9 to 1.4, at which the cadence drops to 48.8. As the output speed increases to 200-rpm, the cadence rises to 64-rpm, and the SR remains constant at 1.4. This is an example of automatically controlling a transmission such that the cadence is controlled relative to a three-speed ratio shifting scheme. Of course, similar maps can be provided for other automatic modes, such as 4-, 5-, 6-, 8-, or 9-speed, for example. In addition, the cadence ranges can be adjusted by moving shift events via the mapping, such as a range of 65-rpm to 90-rpm instead of 50-rpm to 75-rpm, for a given vehicle speed or range of vehicle speeds, for example. In some embodiments, the maps can have any desired relationship (for example, linear, exponential, inverse, etc.) between output speed and cadence.

Figure 6:
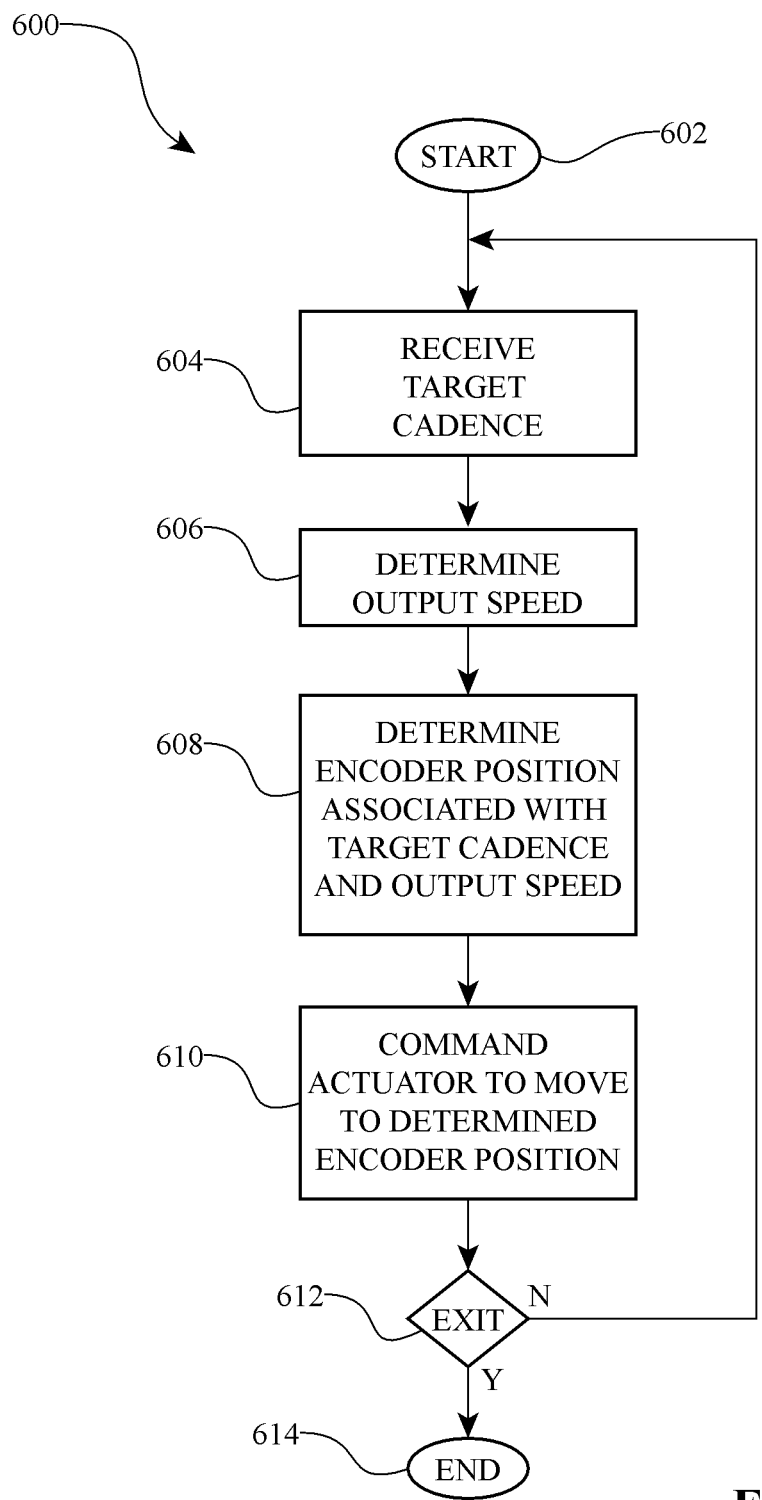
FIG. 6 is a process flow chart of an automatic transmission control method in accordance with the inventive embodiments described herein.

Turning to FIG. 6, it will be described now a process 600 for controlling a transmission 316 so that a rider cadence is controlled to be within a band of a rider selected cadence level. The process 600 starts at a state 602 after a bicycle automatic shifting system 300, for example, has been turned on and initialized. The process 600 continues to a state 604 and receives an indication of a target constant cadence level.

In one embodiment, the rider uses the user interface 308 to provide the target constant cadence level. The process 600 moves next to a state 606 where a speed of the bicycle is determined. In one embodiment, the speed sensor 304 detects the speed of the bicycle wheel 318. However, in other embodiments, the speed of the bicycle can be determined by measuring and/or sensing other characteristics or components of the bicycle, such as detecting a voltage, resistance, or current level on a dynamo (not shown) coupled to the bicycle wheel 318. The process 600 then continues to a state 608 wherein an encoder position associated with a bicycle speed and a target cadence is determined or identified. In one embodiment, the digital processor 322 cooperates with the memory 324 and the logic module 326 to query a table 330 and thereby select an encoder position that is correlated with a bicycle speed and a target cadence. At a state 610 of the process 600, an actuator is commanded to move to a position associated with the selected encoder position of state 608. In some embodiments, at a decision state 612 of the process 600, it is determined whether the process 600 should exit and end at a state 614 or loop back to the state 604 to receive a target cadence input. At the state 604, the process 600 can query whether the rider has commanded a new cadence level; if not, the process 600 continues using the cadence level initially entered. In one embodiment, the rider does not set the cadence level initially, but rather the control unit 302 is configured to use a default cadence level, such as 70-rpm for example. In yet other embodiments, a cadence-versus-output speed map (rather than a specific cadence value) can be provided to the process at the state 604. As previously discussed, such a map can include any kind of mapping associating cadence, output speed, and corresponding SR. At the state 614 of the process 600, the decision to exit can be based on a power off condition, a mode change command, or the like. For example, if the rider changes the mode from automatic mode to manual mode, the process 600 detects the new condition and exits at the state 614.

Those of skill will recognize that the various illustrative logical blocks, modules, circuits, and algorithm steps described in connection with the embodiments disclosed herein, including with reference to the automatic shifting bicycle system 300 may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC. For example, in one embodiment, the control unit 302 comprises a processor (not shown). The processor of the control unit 302 may also be configured to perform the functions described herein with reference to one or both of the motor controller 328 and the user interface 308.

The foregoing description details certain preferred embodiments of the present invention and describes the best mode contemplated. It will be appreciated, however, that no matter how detailed the foregoing appears in text, the invention can be practiced in many ways. The scope of the present invention should therefore be construed only in accordance with the appended claims and any equivalents thereof.

What is claimed is:

1. A bicycle comprising:
   a transmission;
   a system for automatically shifting the transmission, the system comprising:
      a speed sensor configured to detect a speed of the bicycle;
      a control unit configured to receive input from the speed sensor;
      a data input interface configured to provide cadence data to the control unit, said cadence data indicative of a desired, constant input pedaling speed;
      a memory in communication with the control unit, the memory having stored therein one or more data structures correlating bicycle speeds with speed ratios;
      wherein the control unit is configured to determine from said data structures a target speed ratio based on the speed of the bicycle and the cadence data, and
   an actuator configured to selectively tilt a power transmitting ball of the transmission, in communication with the control unit, the actuator configured to adjust a speed ratio of the transmission to be substantially equal to the determined target speed ratio.

2. The bicycle of claim 1, wherein the data input interface comprises a display and at least one button.

3. The bicycle of claim 2, wherein the data input interface is mounted on a handlebar of the bicycle.

4. The bicycle of claim 1, further comprising a position sensor configured to provide an indication of a position of the actuator.

5. The bicycle of claim 4, wherein the data structures have a speed ratio data structure and a bicycle speed data structure.

6. The bicycle of claim 1, wherein the ball-planetary transmission comprises a shift rod, the shift rod operably coupled to the actuator.

7. An automatic shifting bicycle system comprising:
   a transmission having a shift rod;
   an actuator operably coupled to the shift rod;
   a control unit in communication with the actuator;
   a memory in communication with the control unit, the memory storing at least one table correlating a position of the actuator to the transmission ratio, wherein the table contains data that correlates a position of the shift rod to a transmission ratio and data that correlates the position of the shift rod to a cadence level, and wherein the control unit communicates a desired transmission ratio to the actuator based at least in part on the table.

8. The system of claim 7, wherein the processor is configured to determine a target speed ratio for the transmission.

9. The system of claim 7, further comprising a speed sensor configured to detect a speed of the transmission, the speed sensor in communication with the processor.

10. The system of claim 7, wherein the actuator is adapted to adjust the transmission ratio based at least in part on the target transmission ratio.

11. The system of claim 10, wherein the actuator is configured to rotate the shift rod to adjust the transmission ratio.

12. The system of claim 7, further comprising a user interface in communication with the processor.

13. The system of claim 12, wherein the user interface is configured to receive a command from an operator, the command indicative of a desired operating condition.

14. The system of claim 13, wherein the user interface comprises at least one button.

15. The system of claim 14, wherein the user interface comprises a display.

16. The system of claim 13, wherein the desired operating condition is a desired cadence level.

17. The system of claim 13, wherein the desired operating condition is a speed of the bicycle.

18. The system of claim 7, further comprising an encoder in communication with the processor, the encoder configured to indicate a position of the shift rod.

\* \* \* \* \*

UNITED STATES PATENT AND TRADEMARK OFFICE
CERTIFICATE OF CORRECTION

PATENT NO. : 8,626,409 B2  
APPLICATION NO. : 13/681792  
DATED : January 7, 2014  
INVENTOR(S) : Vasiliotis et al.

Page 1 of 1

It is certified that error appears in the above-identified patent and that said Letters Patent is hereby corrected as shown below:

In the Specification

In column 4 at line 5, after "speed" insert --$w_i$.--

Signed and Sealed this  
Twenty-sixth Day of August, 2014

Michelle K. Lee  
*Deputy Director of the United States Patent and Trademark Office*